Patented Nov. 13, 1945

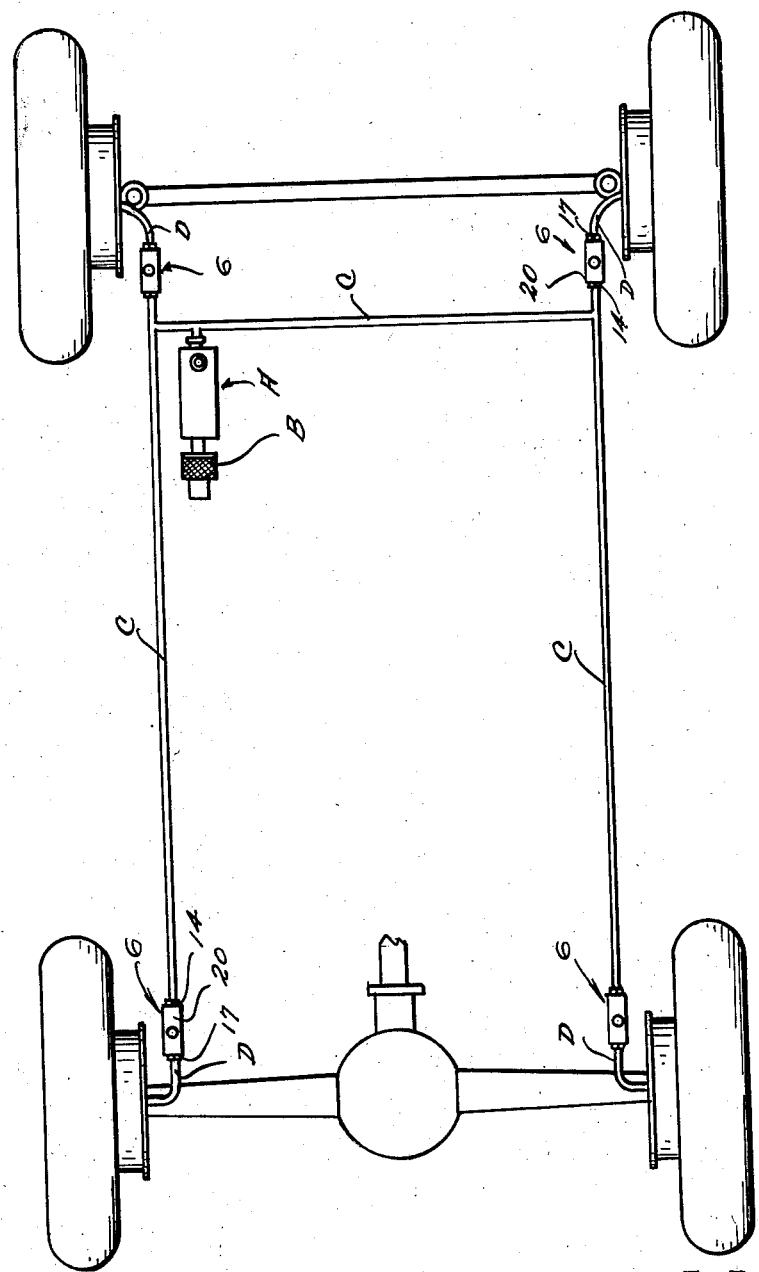

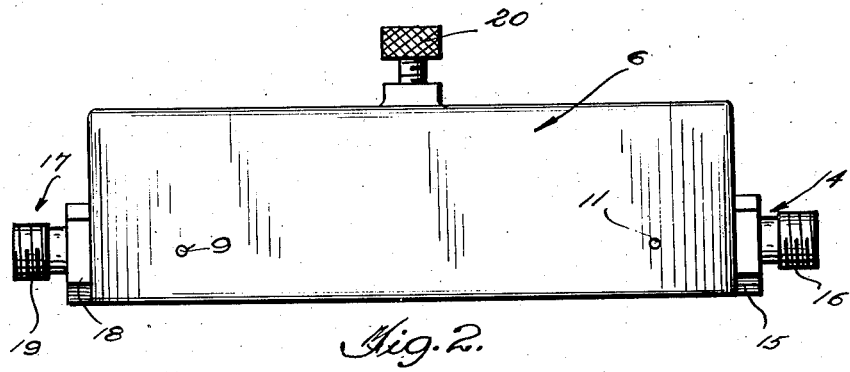
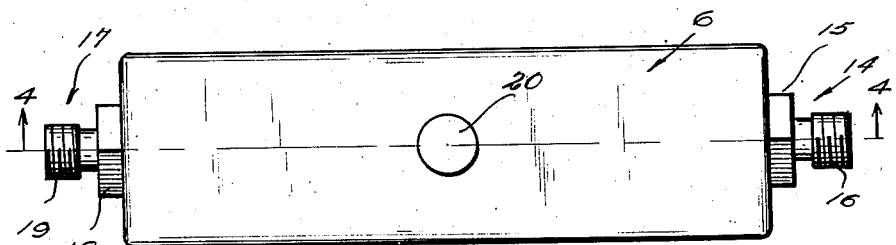
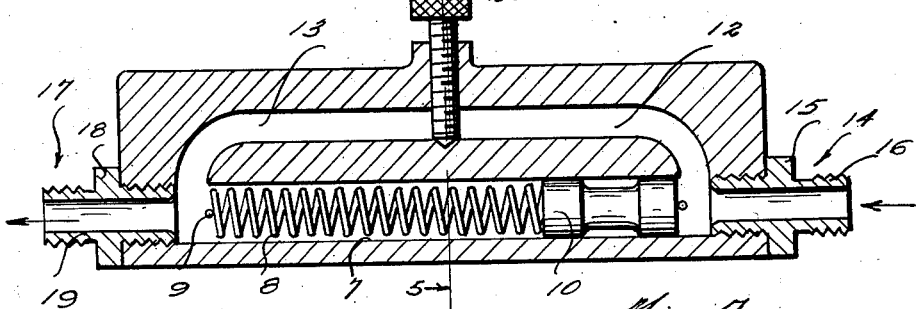
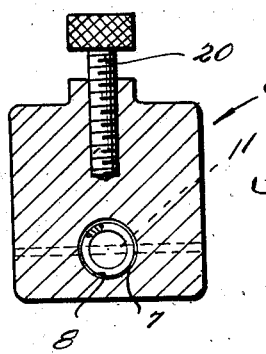

2,388,706

UNITED STATES PATENT OFFICE 2,388,706

HYDRAULIC SAFETY BRAKE SYSTEM

Clyde E. Roy, Houston, Tex.

Application February 9, 1944, Serial No. 521,693

1 Claim. (Cl. 303—84)

The present invention relates to certain improvements in vehicle hydraulic brake systems and has more specific reference to the adoption and incorporation in the fluid pressure line of specially constructed safety devices, one device for each wheel, whereby to make it possible to isolate the adjacent or coacting wheel if a leak occurs between the contemplated safety device and its associated wheels.

Generally speaking, the conventional hydraulic brake system, such as is now used in connection with automobiles and the like, is characterized, essentially, by a manually depressed foot pedal arrangement coacting with a master cylinder, the latter, connected with the four wheel shoe brake cylinders through the medium of fluid circulating and distributing pipe lines. The master cylinder is, in turn, connected with a fluid supply reservoir or tank.

As is a fact well known to automobile drivers, most leakages occur either in the wheel cylinders or flexible hoses connecting the cylinders with the discharge end of the distributing pipe line. Considering the fact that leakage at any one of these points is a source of constant danger, all sorts of compensating and safety devices have been suggested for use. Perhaps some of these devices aptly serve the purposes for which they are intended. However, and notwithstanding this, I have evolved and produced a safety device which, in my judgment, is possessed of the utmost simplicity and efficiency. Hence, since, ordinarily, only a single blowout or leakage at one wheel point is likely to occur at the same time, the provision of my safety devices in connection with each of the wheels enables the driver to function with a reasonable assurance that the braking power of but a single wheel will likely occur, thus giving him an opportunity to repair the damage and virtually eliminate accidents from faulty brakes.

In carrying out the principles of the invention I utilize a simple cylinder and piston arrangement with appropriate fittings at opposite ends of the cylinder and a valved by-pass for convenient line bleeding purposes.

Other features and advantages will become more readily apparent from the following description and the accompanying illustrative drawings.

In the drawings, wherein like numerals are employed to designate like parts throughout the same:

Figure 1 is a top plan view showing, somewhat diagrammatically, four wheels equipped with brake drums and mechanism therein, master cylinder, pedal for operating the same, the apportioning and distributing pipe lines, and the safety devices included in the lines adjacent the respective brake drum-equipped wheel.

Figure 2 is a side elevational view of the safety device per se.

Figure 3 is a top plan view thereof.

Figure 4 is a longitudinal section taken centrally on the plane of the line 4—4 of Figure 3.

Figure 5 is a transverse central section taken on the line 5—5 of Figure 4, looking in the direction of the arrows.

In Figure 1 the master cylinder, which is of conventional construction and design, is denoted by the reference character A and its operating foot pedal is indicated at B. The distributing pipes, also conventional, are denoted by the characters C. The safety devices are referred to as a unit by the numeral 6. These are attached to the distributing pipe lines C within the vicinity of the respective brake drum equipped wheel, this through the medium of the short pipes, generally flexible hoses D. I do not claim any novelty in the system itself but only stress and claim the safety devices C. I provide one device for each wheel, preferably locating the same within the vicinity of the coacting wheel. Each safety device is the same in construction and the description of one will suffice for all. Attention is, therefore, directed to Figures 2 to 5, inclusive. The cylinder of the safety device 6 is in the form of a substantially rectangular casting. Adjacent the bottom it is formed with a longitudinal bore 7 (see Figures 4 and 5) which bore constitutes a cylinder. This cylinder serves to accommodate a coiled spring 8 bearing at one end against an assembling and stop pin 9 and at its opposite end against a double-headed oil pressure return piston 10. The piston is engageable with a check or stop pin 11 which is also removable. Communicating at opposite ends with the thus open-ended cylinder are adjacent branches of a by-pass which is also bored into the casting. The by-pass comprises a right hand chamber or branch 12 and a similar left hand branch or chamber 13. The intake of the brake fluid is by way of the fitting 14 which comprises a nut 15 having a neck threaded into the tap which is formed in the end of the cylinder in alignment with the bore or passage 7. A screw-threaded nipple 16 serves to provide a suitable union or connection with the supply pipe line. The discharge fitting is conveniently denoted by the numeral 17, this being at the left and also including a nut 18 and attaching nipple 19 to which the short tube, hose or flexible element C is connected, the latter being, in turn, connected with the wheel cylinder on the interior of the brake drum construction (not shown). The numeral 20 designates a needle valve for bleed purposes which is normally closed, thus dividing the by-pass into the branches or components 12 and 13. This needle valve is used only for bleeding purposes.

In operation, when the driver of the car steps on the brake pedal B, equal pressure is relayed from the master cylinder A through the pipes C to each of the safety devices 6. The chamber 13 and bore 7 on the left hand side of the piston 10 is charged with brake fluid sufficient to cause the adjacent wheel cylinder (not shown) to function, that is, when additional pressure is brought to bear by the extra charge of fluid entering the intake 14 and exerting driving pressure against the piston 10. The piston 10 forces the charge of oil in the left hand end of the cylinder 6 into the wheel cylinders to apply the brakes in an obvious manner.

When bleeding the system the needle valve 20 is open and one wheel cylinder is bled by pumping the foot pedal up and down until there are no more air bubbles to be seen in the brake fluid coming from the bleeder tube at the wheel. Then, the pedal is held down and the bleeder valve at the wheel is cut off. Next, the pump pedal is pumped up and down until there is a good pressure and the bleed valve 20 is cut off to close the by-pass. This operation is repeated on all four wheels.

If leakage occurs only that portion of the fluid in the chamber 13, cylinder 7 and adjacent part of the feed line and wheel cylinder can escape. The fluid in the chamber 12 and right hand end of the cylinder 7 beyond the piston 10 is retained to avoid disaster. Only one leak would ordinarily occur in normal driving. Hence, the safety device functions automatically leaving at least three wheels at a time to provide the desired temporary braking power.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

A safety device for incorporation in a hydraulic distribution pipe between a master cylinder and the adjacent and coacting wheel cylinder comprising a longitudinally elongated substantially rectangular body provided with a main horizontal bore located adjacent one surface of the body and opening through opposite ends of said body, the ends of said bore being internally screw threaded, nipple fittings threaded into the screw-threaded ends of said bore, a coiled spring mounted in the intermediate portion of said bore, an assembling and stop pin mounted in said bore at a point spaced inwardly from the adjacent nipple, one end of said spring bearing against said pin, a double headed piston fitted snugly in the bore, the opposite end of said spring bearing against one of the piston heads, a second stop and assembling pin bridging the bore at the opposite end portion and located in a position spaced inwardly from the nipple of the adjacent fitting, a coacting auxiliary bore formed in said body and constituting a by-pass, the ends of said auxiliary bore communicating with the end portions of the first-named bore at points outwardly of the spring, piston and said stop and assembling pins, and a needle valve arranged centrally between the ends of the by-pass and dividing it into independent chambers.

CLYDE E. ROY.